United States Patent
Schumann

(10) Patent No.: US 10,838,060 B2
(45) Date of Patent: Nov. 17, 2020

(54) METHOD AND DEVICE FOR DETECTING AT LEAST ONE OBJECT IN THE AREA BETWEEN A PRIMARY COIL AND A SECONDARY COIL OF AN INDUCTIVE CHARGING DEVICE

(71) Applicant: Robert Bosch GmbH, Stuttgart (DE)

(72) Inventor: Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/611,057

(22) PCT Filed: May 9, 2018

(86) PCT No.: PCT/EP2018/062021
§ 371 (c)(1),
(2) Date: Nov. 5, 2019

(87) PCT Pub. No.: WO2018/219612
PCT Pub. Date: Dec. 6, 2018

(65) Prior Publication Data
US 2020/0156490 A1 May 21, 2020

(30) Foreign Application Priority Data
May 31, 2017 (DE) .................. 10 2017 209 095

(51) Int. Cl.
*G01S 15/04* (2006.01)
*B60L 53/124* (2019.01)
*B60L 53/126* (2019.01)

(52) U.S. Cl.
CPC ............ *G01S 15/04* (2013.01); *B60L 53/124* (2019.02); *B60L 53/126* (2019.02)

(58) Field of Classification Search
CPC ....... B60L 53/124; B60L 53/126; G01S 15/04
(Continued)

(56) References Cited

U.S. PATENT DOCUMENTS

| 5,339,691 A * | 8/1994 | Smith ................ G01H 5/00 73/597 |
| 6,307,811 B1 * | 10/2001 | Luber ............... G01S 15/105 340/4.2 |

(Continued)

FOREIGN PATENT DOCUMENTS

| DE | 102009033236 A1 | 1/2011 |
| DE | 102012105615 A1 | 5/2013 |

(Continued)

OTHER PUBLICATIONS

International Search Report for PCT/EP2018/062021, dated Aug. 7, 2018.

*Primary Examiner* — Kerri L McNally
*Assistant Examiner* — Thang D Tran
(74) *Attorney, Agent, or Firm* — Norton Rose Fulbright US LLP; Gerard Messina

(57) ABSTRACT

A method for detecting at least one object between primary and secondary coils of a vehicle's inductive-charging-device. A first ultrasonic signal (FUS) is emitted with a first ultrasonic-transmitter (UT) situated at the primary-coil. A FUS-sequence is received with a first ultrasonic-receiver (FUR) at the vehicle. The FUS-sequence includes at least one first direct-receive signal. Alternatively/in addition, the FUS sequence includes additional receive signals, each of which corresponds to an indirect transmission of the ultrasonic-signal from the at least one UT to the FUR. The first direct receive signal is ascertained within the FUS-sequence and/or additional receive signals are ascertained within the FUS-sequence. The first received ultrasonic-signal-sequence, which includes the ascertained direct-receive-signal and/or ascertained additional receive signals is compared to a first reference-ultrasonic-signal-sequence. At least one (Continued)

object is subsequently detected between the primary and secondary coils as a function of this comparison.

13 Claims, 9 Drawing Sheets

(58) Field of Classification Search
USPC .......................................................... 367/93
See application file for complete search history.

(56) References Cited

U.S. PATENT DOCUMENTS

| | | | | |
|---|---|---|---|---|
| 6,457,364 | B1* | 10/2002 | Howell | G01S 7/527 340/426.28 |
| 9,297,891 | B2* | 3/2016 | Karl | G01S 7/539 |
| 2006/0167595 | A1* | 7/2006 | Breed | B60R 21/01536 701/1 |
| 2006/0233200 | A1* | 10/2006 | Fifield | H04L 1/188 370/473 |
| 2007/0008819 | A1* | 1/2007 | Diessner | G01S 15/878 367/99 |
| 2008/0018429 | A1* | 1/2008 | Kudoh | G06K 19/07749 340/10.1 |
| 2008/0157940 | A1* | 7/2008 | Breed | B60N 2/853 340/425.5 |
| 2008/0292146 | A1* | 11/2008 | Breed | B60N 2/002 382/118 |
| 2009/0046538 | A1* | 2/2009 | Breed | B60R 25/102 367/93 |
| 2010/0067324 | A1* | 3/2010 | Preissler | G01S 7/52004 367/13 |
| 2010/0134321 | A1* | 6/2010 | Kim | G01S 15/931 340/932.2 |
| 2012/0161696 | A1* | 6/2012 | Cook | B60L 55/00 320/108 |
| 2012/0176864 | A1* | 7/2012 | Karl | G01S 15/582 367/89 |
| 2014/0028632 | A1* | 1/2014 | Thielemann | G06F 3/043 345/177 |
| 2014/0239891 | A1* | 8/2014 | Martin | B60L 53/124 320/108 |
| 2015/0321567 | A1* | 11/2015 | Czainski | H02J 50/70 191/10 |
| 2015/0323694 | A1* | 11/2015 | Roy | B60L 53/12 307/104 |
| 2016/0006260 | A1* | 1/2016 | Nakamura | H02J 50/12 307/104 |
| 2016/0028265 | A1* | 1/2016 | Bell | H02J 50/90 320/108 |
| 2016/0176299 | A1* | 6/2016 | Kautz | B60L 53/12 307/9.1 |
| 2016/0247402 | A1* | 8/2016 | Huang | H04L 67/12 |
| 2016/0248271 | A1* | 8/2016 | Amari | H02J 50/12 |
| 2016/0288655 | A1* | 10/2016 | Mayers | B60L 53/124 |
| 2017/0033609 | A1* | 2/2017 | Nakamura | H02J 7/025 |
| 2017/0153108 | A1* | 6/2017 | Kitazawa | G01N 29/4436 |
| 2017/0259682 | A1* | 9/2017 | Oettle | B60L 53/124 |
| 2017/0322304 | A1* | 11/2017 | Matsuura | G01S 15/02 |
| 2018/0156916 | A1* | 6/2018 | Nomura | G01S 7/539 |
| 2018/0342907 | A1* | 11/2018 | Dimke | B60L 53/124 |

FOREIGN PATENT DOCUMENTS

| | | |
|---|---|---|
| DE | 102012219986 A1 | 6/2014 |
| DE | 102013220124 A1 | 4/2015 |
| DE | 102015111259 A1 | 1/2016 |

* cited by examiner

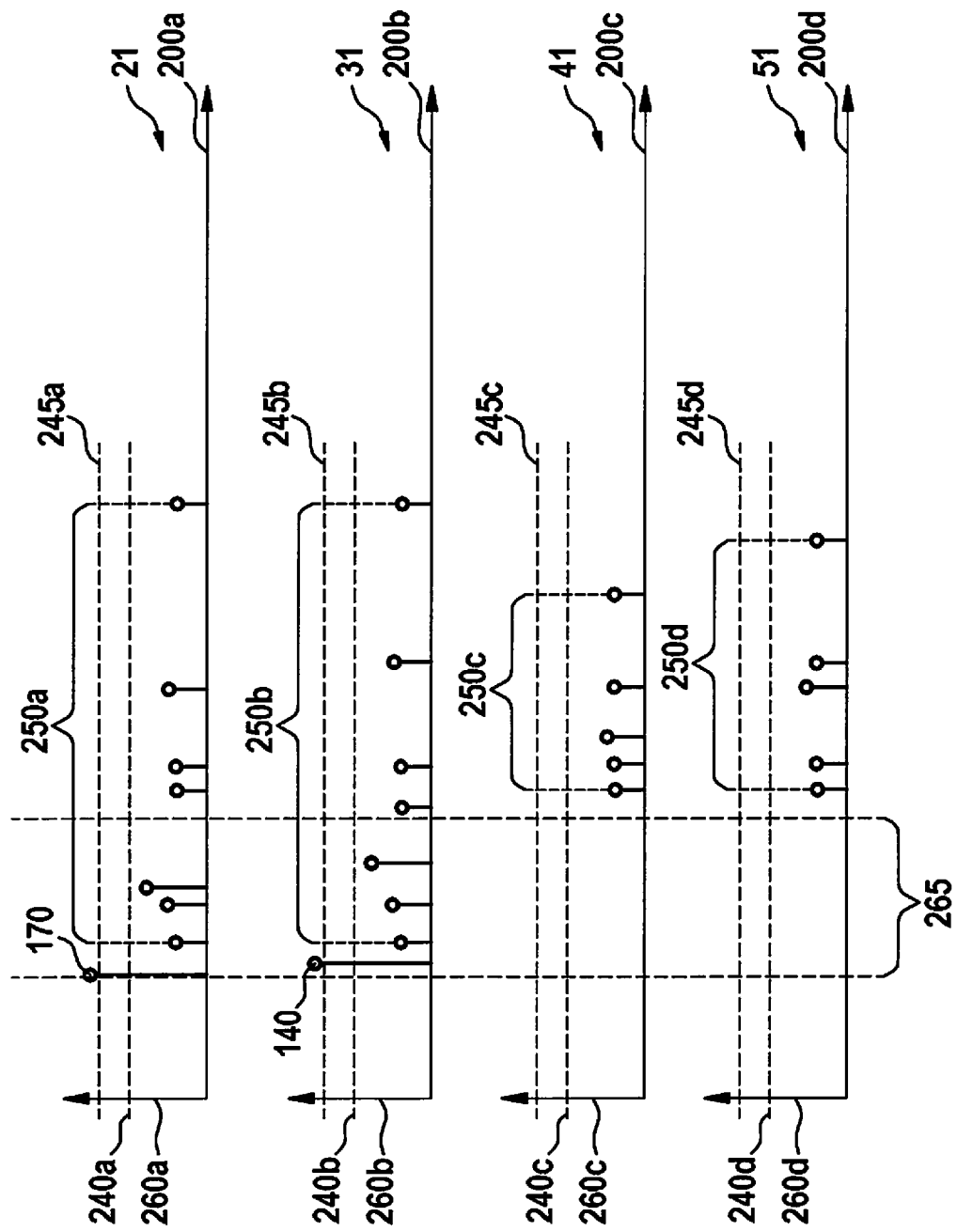

METHOD AND DEVICE FOR DETECTING AT LEAST ONE OBJECT IN THE AREA BETWEEN A PRIMARY COIL AND A SECONDARY COIL OF AN INDUCTIVE CHARGING DEVICE

FIELD OF THE INVENTION

The present invention relates to a method and a device for detecting at least one object in the area between a primary coil and a secondary coil of an inductive charging device for a vehicle.

BACKGROUND INFORMATION

The document DE 10 2009 033 236 A1 discusses a device for inductively transmitting electrical energy from a stationary unit having at least one primary inductance to a vehicle adjacent to this stationary unit having at least one secondary inductance. The device includes a unit for detecting the presence of an object within a particular space. The detection unit includes a contactless sensor, for example, an ultrasonic sensor. In this case, for example, four ultrasonic sensors are provided, which are situated symmetrically in the shape of a square. The presence of the foreign body is deduced by evaluating the reflection back to the emitting sensor, by evaluating the reflection strength and by evaluating the chronological sequence of the measuring signals.

It is important to detect foreign objects within the charging area of an inductive charging device, since it may result in a life-threatening situation for pet animals, for example, located within the charging area of an inductive charging device. The energy transmission is also disrupted by potential foreign objects.

The object of the present invention is to develop a method and a device, in which the detection of a foreign object in the area between a primary coil and secondary coil of an inductive charging device is optimized. This is very important, for example, since it may result in a life-threatening situation for pet animals, for example, located within the charging area of the inductive charging device. The energy transmission is also disrupted by potential foreign objects.

SUMMARY OF THE INVENTION

To achieve the object, a method is provided according to the present invention for detecting at least one object in the area between a primary coil and a secondary coil of an inductive charging device for a vehicle according to the features described herein. In addition, a device is provided for detecting at least one object in the area between a primary coil and a secondary coil of an inductive charging device for a vehicle, which carries out the method.

In the method according to the present invention for detecting at least one object in the area between a primary coil and a secondary coil of an inductive charging device for a vehicle, a first ultrasonic signal is emitted in one method step with the aid of a first ultrasonic transmitter. The first ultrasonic transmitter in this case is situated at the primary coil, so that it may be roughly assumed that the ultrasonic transmitter and the primary coil have the same location. In another method step, a first ultrasonic signal sequence is received with the aid of a first ultrasonic receiver situated at the vehicle. The first ultrasonic signal sequence in this case includes at least one first direct receive signal. This signal, also referred to as a direct runner, corresponds to a direct transmission of the at least one ultrasonic signal from the first ultrasonic transmitter to the first ultrasonic receiver, without previous reflection of the signal on one or on multiple objects.

Alternatively or in addition, the first ultrasonic signal sequence includes additional receive signals, each of which corresponds to an indirect transmission of the ultrasonic signal from the at least one ultrasonic transmitter to the first ultrasonic receiver. Hence, this involves signals that are reflected once or multiple times on objects before they reach the first ultrasonic transmitter. In this case, it may also involve interferences in the signal reception such as, for example, noise signals. The first direct receive signal within the first ultrasonic signal sequence is subsequently ascertained in a further method step. Alternatively or in addition, additional receive signals are ascertained within the first ultrasonic signal sequence. Subsequently, the first received ultrasonic signal sequence, which includes the ascertained direct receive signal and/or the ascertained additional receive signals, is compared in a subsequent method step with a first reference ultrasonic signal sequence. At least one object is subsequently detected in the area between the primary coil and the secondary coil as a function of this comparison.

The method described offers a cost-efficient and easily implementable option for detecting foreign objects in an inductive charging device, in particular, in an interspace between the primary coil and the secondary coil.

The first reference ultrasonic signal sequence may correspond to an ultrasonic signal sequence, in which no object is detected in the area between the primary coil and the secondary coil. Thus, it is possible to quickly deduce a foreign object as a result of deviations determined in the comparison between the received ultrasonic signal sequence and the stored reference ultrasonic signal sequence. The reference ultrasonic signal sequence may therefore include, for example, a first direct receive signal, since it is provided that the first ultrasonic receiver includes a first direct receive signal if no foreign object is detected between the primary coil and the secondary coil. If, for example, this first direct receive signal is then ascertained as a difference in the comparison between the first ultrasonic signal sequence and the first reference ultrasonic signal sequence, it may be assumed that the emitted ultrasonic signal has been reflected by a foreign object and a foreign object is accordingly detected. However, it may also be that the received first ultrasonic signal sequence and the reference ultrasonic signal sequence differ by a first receive signal. This first receive signal belongs to the additional receive signals and is then ascertained in the first ultrasonic signal sequence if the emitted ultrasonic signal is reflected by a foreign object and from there has been guided directly further to the ultrasonic receiver. Such additional receive signals may then occur both when it is provided that the ultrasonic receiver is to receive a direct receive signal, as well as when the ultrasonic receiver is unable to receive any direct receive signal at all.

A first receive signal, which corresponds to an indirect transmission of the first ultrasonic signal from the first ultrasonic transmitter to the first ultrasonic receiver and to a reflection of the first ultrasonic signal at the object, may be ascertained if a first threshold value is exceeded by an amplitude of the first receive signal. The first direct receive signal is ascertained if a second threshold value is exceeded by an amplitude of the first direct receive signal. Since the first direct receive signal is not reflected before being received, it has more sound energy and a correspondingly greater amplitude as compared to the first receive signal. As a result, it is advantageous to select the second threshold value to be greater than the first threshold value in order to be able to better distinguish between direct receive signals and additional receive signals.

In one alternative embodiment of the method, a second ultrasonic signal sequence may be received with the aid of a second ultrasonic receiver situated at the vehicle. The second ultrasonic signal sequence in this case includes a second direct receive signal, which corresponds to a direct transmission of the at least one ultrasonic signal from the at least one ultrasonic transmitter to the second ultrasonic receiver. The second ultrasonic signal sequence also includes additional receive signals, each of which corresponds to an indirect transmission of the first ultrasonic signal from the at least one ultrasonic transmitter to the second ultrasonic receiver. In a further method step, a second direct receive signal is ascertained within the second ultrasonic signal sequence. Alternatively or in addition, additional receive signals are ascertained within the second ultrasonic signal sequence. In a subsequent method step, the first received ultrasonic signal sequence is then compared with the reference ultrasonic signal sequence. In this case, however, the second received ultrasonic signal sequence is then used as a reference ultrasonic signal sequence. A foreign object may be detected if it is provided that the first and the second ultrasonic receiver are each able to receive at least one direct receive signal, but they receive no first direct receive signal. If a first receive signal, which corresponds to an indirect transmission of the first ultrasonic signal from the first ultrasonic transmitter to the first ultrasonic receiver and to a reflection of the first ultrasonic signal at the object, is determined in the comparison between the two ultrasonic signal sequences, this is also an indication of a foreign object. A second receive signal, which corresponds to an indirect transmission of the first ultrasonic signal from the first ultrasonic transmitter to the second ultrasonic receiver and to a reflection of the first ultrasonic signal at the object, is equally an indication of a foreign object between the primary coil and the secondary coil. The first receive signal may be ascertained as a function of an exceedance of a first threshold value by an amplitude of the first receive signal. The first direct receive signal is ascertained as a function of an exceedance of a second threshold value by an amplitude of the first direct receive signal. In this case, the second threshold value is greater than the first threshold value. The second receive signal is ascertained as a function of an exceedance of a third threshold value by an amplitude of the second threshold value. The second direct receive signal is ascertained as a function of an exceedance of a fourth threshold value by an amplitude of the second direct receive signal.

In this case, the first threshold value may be different from the third threshold value and the second threshold value is different from the fourth threshold value. Thus, the threshold values may be better adjusted to a different sensitivity of the ultrasonic receiver. Alternatively, however, it may also be provided that the first threshold value is equal to the third threshold value and the second threshold value is equal to the fourth threshold value. This allows for a better comparability of the received direct receive signals and/or of additional receive signals among one another.

Each ultrasonic signal sequence may be received in an associated timed measuring window. The duration of the measuring windows is established accordingly. The measuring windows of each of the ultrasonic receivers in this case are synchronized to one another. This means that all measuring windows start and end at the same time. Thus, the ultrasonic signal sequences may be better compared with reference ultrasonic signal sequences.

The present invention also includes a device for detecting at least one object in the area between a primary coil and a secondary coil of an inductive charging device for a vehicle. The device in this case carries out the previously described method for detecting an object between a primary coil and a secondary coil. The device includes a first ultrasonic transmitter situated at the primary coil, which emits at least one first ultrasonic signal. The device also includes a first ultrasonic receiver, which receives a first ultrasonic signal sequence that includes at least one direct receive signal and additional receive signals. The device also includes a processing unit, which ascertains the first direct receive signal and/or additional receive signals within the first ultrasonic signal sequence and compares the first received ultrasonic signal sequence with a reference ultrasonic signal sequence. The processing unit is also configured to detect at least one object in the area between the primary coil and the secondary coil as a function of the comparison between the first ultrasonic signal sequence and the reference ultrasonic signal sequence.

In addition, the device may include a second, third and fourth ultrasonic receiver. The second ultrasonic receiver, like the first ultrasonic receiver, is situated at the vehicle in such a way that it is able to receive a direct receive signal. Alternatively or in addition, the second ultrasonic receiver may also receive additional receive signals. The third and fourth ultrasonic receivers are situated at the vehicle in such a way that these ultrasonic receivers are only able to receive additional receive signals. The processing unit in this case is configured to ascertain the direct receive signals and/or additional receive signals within the respective ultrasonic signal sequences. The processing unit is also configured to compare the first received ultrasonic signal sequence with the second ultrasonic signal sequence of the second ultrasonic receiver. In this case, the processing unit detects an object in the area between the primary coil and the secondary coil if the first and/or the second ultrasonic signal sequence includes no first direct receive signal. Alternatively or in addition, the processing unit is configured to detect a foreign object if the first ultrasonic signal sequence includes a first receive signal. Alternatively or in addition, the processing unit is configured to detect a foreign object if the second ultrasonic signal sequence includes a second receive signal. The processing unit is also configured to compare the first received ultrasonic signal sequence with the third ultrasonic signal sequence of the third ultrasonic receiver. The processing unit in this case is also configured to detect an object between a primary coil and a secondary coil if the third ultrasonic signal sequence includes a third receive signal that corresponds to an indirect transmission of the first ultrasonic signal from the first ultrasonic transmitter to the third ultrasonic receiver and to a reflection of the first ultrasonic signal at the object. The processing unit in this arrangement of ultrasonic receivers is also configured to compare the first received ultrasonic signal sequence with the fourth ultrasonic signal sequence of the fourth ultrasonic receiver. The processing unit in this case is also configured to detect an object between a primary coil and a secondary coil if the fourth ultrasonic signal sequence includes a fourth receive signal that corresponds to an indirect transmission of the first ultrasonic signal from the first ultrasonic transmitter to the fourth ultrasonic receiver and to a reflection of the first ultrasonic signal at the object. With this described arrangement of ultrasonic receivers, it is possible to more reliably determine a foreign object. In addition, the device may include a second ultrasonic transmitter situated at the primary coil of the inductive charging device, which is configured for emitting at least one second ultrasonic signal. The first and second ultrasonic transmitters in this case are situated at the primary coil in such a way that the first ultrasonic signal is emitted in the direction of the second ultrasonic transmitter and the second ultrasonic signal is emitted in the direction of the first ultrasonic transmitter.

The third and fourth ultrasonic receivers in this case are situated at the vehicle in such a way that a third direct receive signal may be received by the third ultrasonic receiver and a fourth direct receive signal may be received by the fourth ultrasonic receiver. The third and fourth direct receive signal in this case refer to a directly transmitted ultrasonic signal from the second ultrasonic transmitter to the third ultrasonic receiver and to the fourth ultrasonic receiver. This increases the redundancy of the device. To better distinguish the emitted ultrasonic signals of the first ultrasonic transmitter and of the second ultrasonic transmitter when detecting the foreign object, it may be provided that the first ultrasonic transmitter and the second ultrasonic transmitter emit alternatingly coded ultrasonic signals.

It may be provided that each of the ultrasonic transmitters is configured to emit repeatedly a first and/or a second ultrasonic signal. Each ultrasonic receiver in this case is configured to receive at least one additional ultrasonic signal sequence, which follows chronologically the previously received ultrasonic signal sequence. The processing unit detects at least one object in the area between a primary coil and a secondary coil of an inductive charging device as a function of a comparison of successive ultrasonic signal sequences with the associated reference ultrasonic sequences to detect. This offers the possibility of ascertaining the chronological change of received signals and thus, for example, to be able to draw conclusions about the movement of a dynamic foreign object in the area between the primary coil and a secondary coil.

BRIEF DESCRIPTION OF THE DRAWINGS

FIG. 1b shows, by way of example, a first ultrasonic signal sequence, a second ultrasonic signal sequence, a third ultrasonic signal sequence and a fourth ultrasonic signal sequence based on the situation depicted in FIG. 1a.

FIG. 2b shows, by way of example, a first ultrasonic signal sequence, a second ultrasonic signal sequence, a third ultrasonic signal sequence and a fourth ultrasonic signal sequence based on the situation depicted in FIG. 2a.

FIG. 3b shows, by way of example, a first ultrasonic signal sequence, a second ultrasonic signal sequence, a third ultrasonic signal sequence and a fourth ultrasonic signal sequence based on the situation depicted in FIG. 3a.

DETAILED DESCRIPTION

Figure 1A:
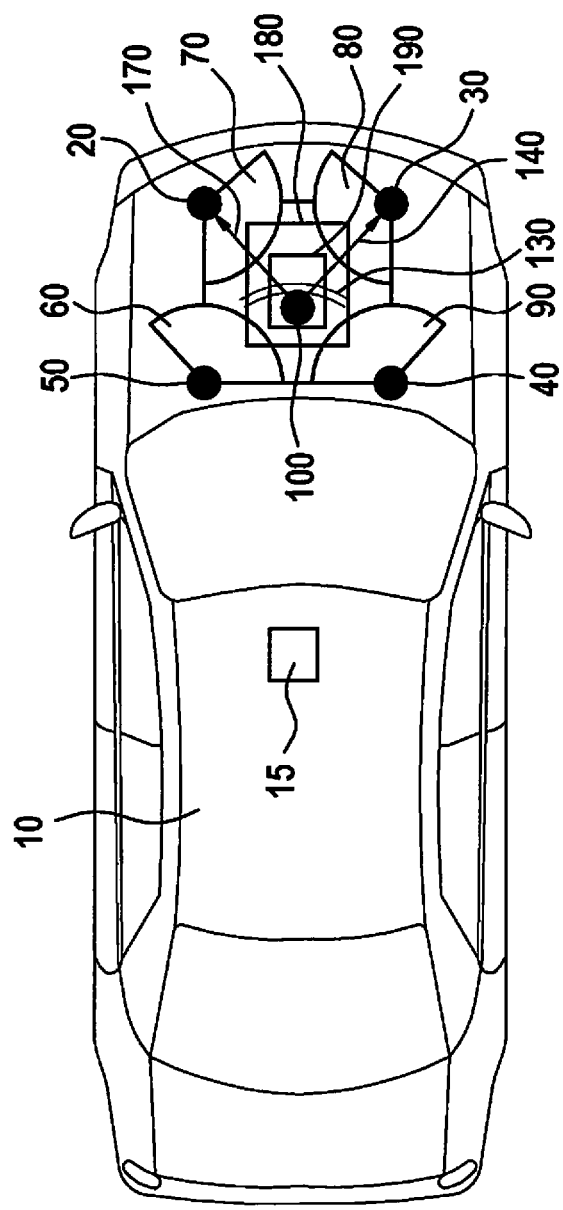
FIG. 1a shows a first specific embodiment of the device for detecting at least one object in the area between a primary coil and a secondary coil of an inductive charging device. In the situation depicted, no object is present between the primary coil and the secondary coil.

FIG. 1a shows a vehicle 10, which is positioned in such a way that primary coil 190 and secondary coil 180 are situated one above the other and an inductive energy transmission may be optimally carried out. A first ultrasonic transmitter 100, which emits a first ultrasonic signal 130 in the form of sound waves, is situated at a lateral edge of primary coil 190. A first ultrasonic receiver 20, a second ultrasonic receiver 30, a third ultrasonic receiver 40 and a fourth ultrasonic receiver 50 are situated at the underbody of vehicle 10 around secondary coil 180 of the inductive charging device in such a way that ultrasonic receivers 20, 30, 40, and 50 each form the corners of a square and the secondary coil is located centrally within this stretched square. First ultrasonic transmitter 100 transmits an ultrasonic signal 130 in the direction of first ultrasonic receiver 20 and of second ultrasonic receiver 30. First receiving area 70 of first ultrasonic receiver 20 and second receiving area 80 of the second ultrasonic receiver are oriented in such a way that ultrasonic receivers 20 and 30 are able to receive a first direct receive signal 170 and a second direct receive signal 140. Since no object is located between primary coil 190 and secondary coil 180 in the situation depicted, the two ultrasonic sensors 20 and 30 also actually receive direct receive signals.

FIG. 1b shows a possible first ultrasonic signal sequence 21, second ultrasonic signal sequence 31, third ultrasonic signal sequence 41 and fourth ultrasonic signal sequence 51 of associated first ultrasonic receiver 20, second ultrasonic receiver 30, third ultrasonic receiver 40 and fourth ultrasonic receiver 50, which may occur as a result of the situation depicted in FIG. 1a. Time is plotted, for example, on X-axes 200a, 200b, 200c and 200d of the respective ultrasonic signal sequences 21, 31, 41 and 51 and Y-axes 260a, 260b, 260c and 260d characterize the size of the amplitudes of the received ultrasonic signals. Each ultrasonic sequence 21, 31, 41 and 51 is received in an associated timed measuring window 265, which are synchronized to one another. Processing unit 15, which in this illustration is depicted as part of vehicle 10, is configured to ascertain first direct receive signal 170 within first ultrasonic signal sequence 21. First direct receive signal 170 is ascertained with the aid of processing unit 15 by exceeding a second threshold value 245a-245d. Also apparent is a first threshold value 240a-240d, upon the exceedance of which processing unit 15 ascertains a first receive signal. Processing unit 15 is also configured to ascertain additional receive signals 250a within the first ultrasonic signals sequence, which may represent interference signals or repeatedly reflected signals, for example. Second ultrasonic signal sequence 32, third ultrasonic signal sequence 43 and the fourth ultrasonic signal sequence also include such associated additional receive signals 250b, 250c and 250d. Processing unit 15 compares first ultrasonic signal sequence 21 with second ultrasonic sequence 31, it being determined that first ultrasonic signal sequence 21 includes a first direct receive signal 170 and second ultrasonic signal sequence 31 includes a second direct receive signal 180. It is also determined that both first ultrasonic signal sequence 21 and the second ultrasonic signal sequence include no first or second receive signal. In addition, processing unit 15, by a comparison with third ultrasonic signal sequence 41 and fourth ultrasonic signal sequence 51, determines that these ultrasonic signal sequences include no third or fourth receive signal. Processing unit 15 concludes from this that there is no object located between primary coil 190 and secondary coil 180.

Figure 2A:
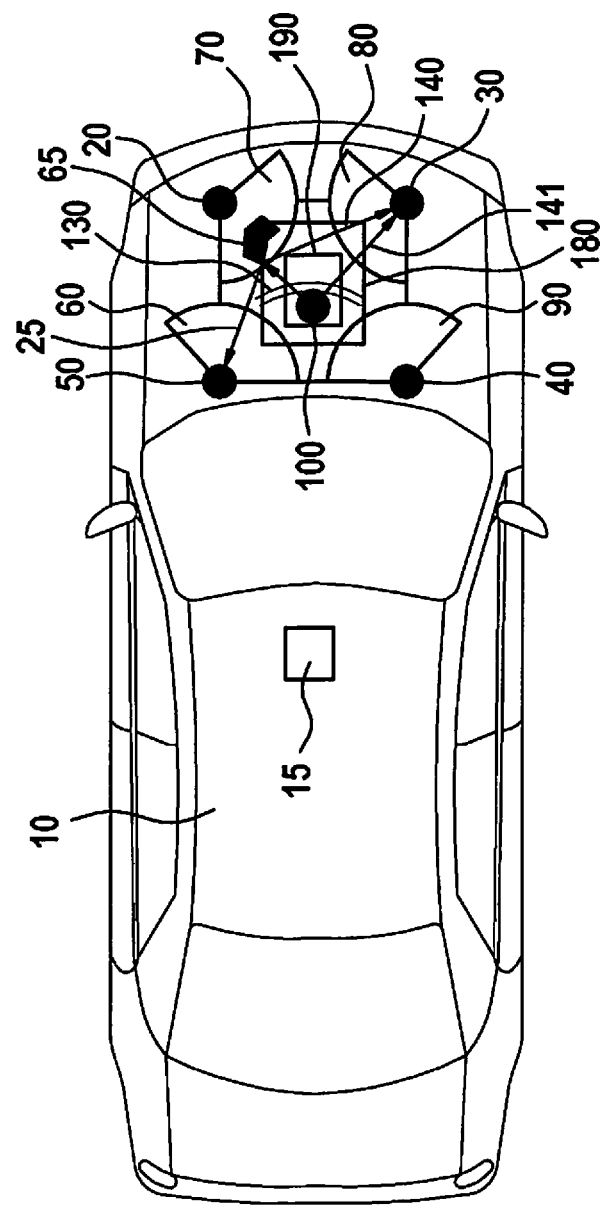
FIG. 2a shows a first specific embodiment of the device for detecting at least one object in the area between a primary coil and a secondary coil of an inductive charging device. In the situation depicted, an object is situated in a first position between the primary coil and secondary coil.

FIG. 2a, in contrast to FIG. 1a, shows a situation, in which an object 65 is located between primary coil 190 and secondary coil 180. Object 65 is situated between primary coil 190 and secondary coil 180 in such a way that first ultrasonic receiver 20 is unable to receive any first direct receive signal. A second receive signal 140, which is transmitted indirectly from first ultrasonic transmitter 100 to second ultrasonic receiver 30, occurs as a result of the reflection of first ultrasonic signal 130 on object 65. In addition, first ultrasonic signal 130 is reflected on object 65 in such a way that fourth ultrasonic receiver 50 is similarly also able to receive a fourth receive signal 25.

Figure 2B:
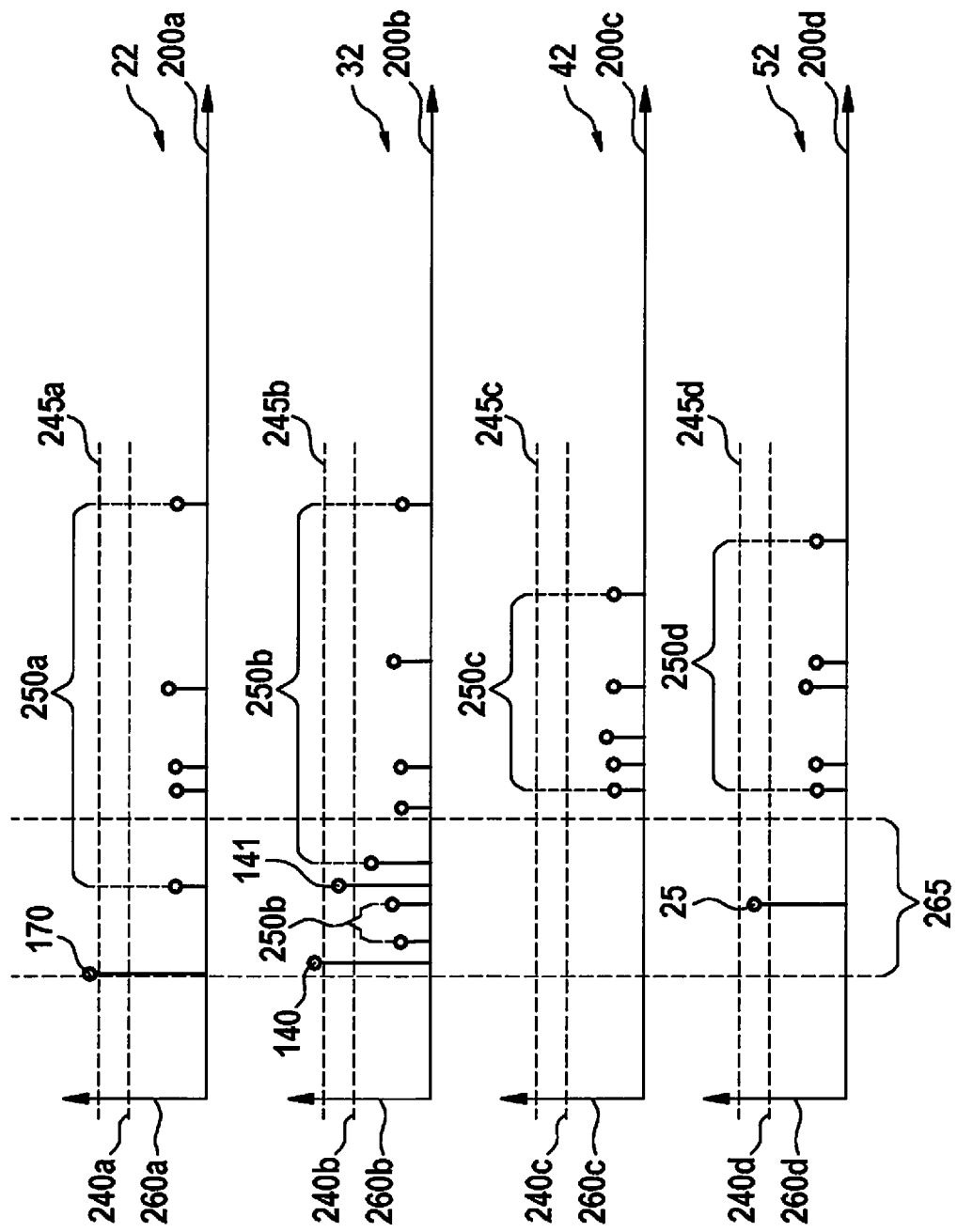

FIG. 2b shows a possible first ultrasonic signal sequence 22, second ultrasonic signal sequence 32, third ultrasonic signal sequence 42 and fourth ultrasonic signal sequence 52 of associated first ultrasonic receiver 20, second ultrasonic receiver 30, third ultrasonic receiver 40 and fourth ultrasonic receiver 50, which may occur as a result of the situation depicted in FIG. 2a. In contrast to FIG. 1b, processing unit 15 is then unable to ascertain any first direct receive signal in first ultrasonic signal sequence 22. In addition, it is determined by a comparison of first ultrasonic signal sequence 22 with second ultrasonic signal sequence 32, that the second ultrasonic signal sequence includes second receive signal 141. The processing unit also determines by a comparison of first ultrasonic signal sequence 22 with fourth ultrasonic signal sequence 52 that fourth ultrasonic signal sequence 52 includes fourth receive signal 25. Processing unit 15 concludes from this that an object 65 is located between primary coil 190 and secondary coil 180. The processing unit is also able to ascertain the position of object 65 as a result of the deviations detected in the comparison carried out. If, in the case of chronologically successive ultrasonic signal sequences, chronological differences in the reception of the direct receive signals or receive signals occur within time window 265, processing unit 15 is also able to conclude from this that it involves a dynamic object 65 and how this object moves.

Figure 3A:
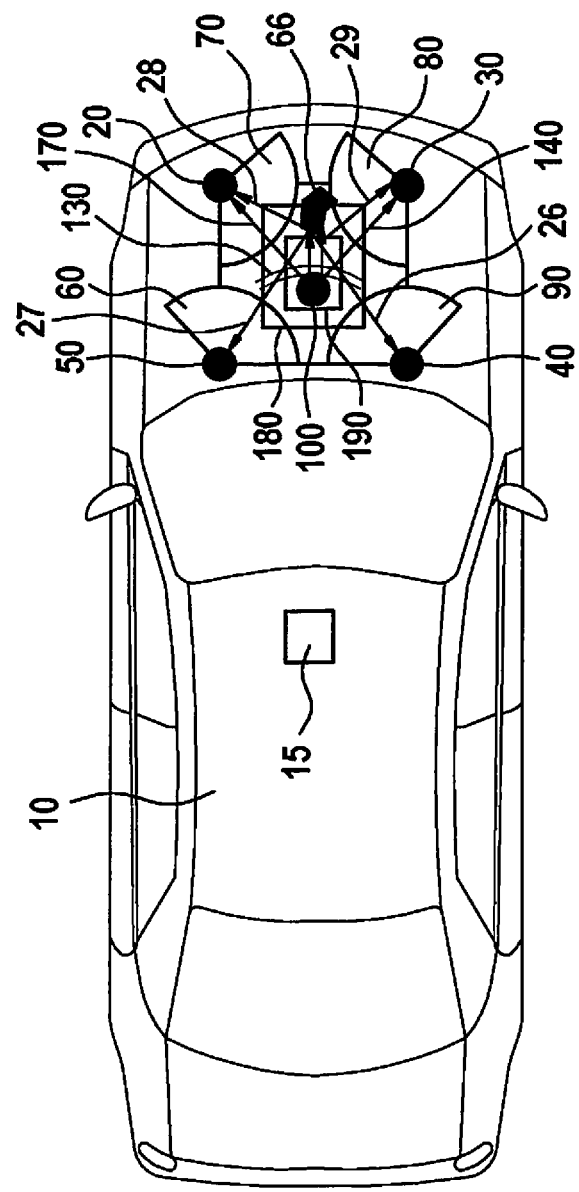
FIG. 3a shows a first specific embodiment of the device for detecting at least one object in the area between a primary coil and a secondary coil of an inductive charging device. In the situation depicted, an object is situated in a second position between the primary coil and secondary coil.

FIG. 3a, in contrast to FIG. 1a, shows a situation, in which an object 66 is located between primary coil 190 and secondary coil 180. In contrast to the situation depicted in FIG. 2a, object 66 in this case is located centrally between first ultrasonic receiver 30 and second ultrasonic receiver 40, so that first ultrasonic receiver 20 is able to receive a first direct receive signal 170 and the second ultrasonic receiver is able to receive second direct receive signal 140. A first receive signal 28, which is transmitted indirectly by first ultrasonic transmitter 100 to first ultrasonic receiver 20 occurs as a result of the reflection of first ultrasonic signal 130 on object 66. In addition, first ultrasonic signal 130 is reflected on object 66 in such a way that second ultrasonic receiver 50 is also able to receive a second receive signal 25. Third ultrasonic receiver 40 also receives a third receive signal 26 and fourth ultrasonic receiver 50 receives a fourth receive signal 27.

Figure 3B:
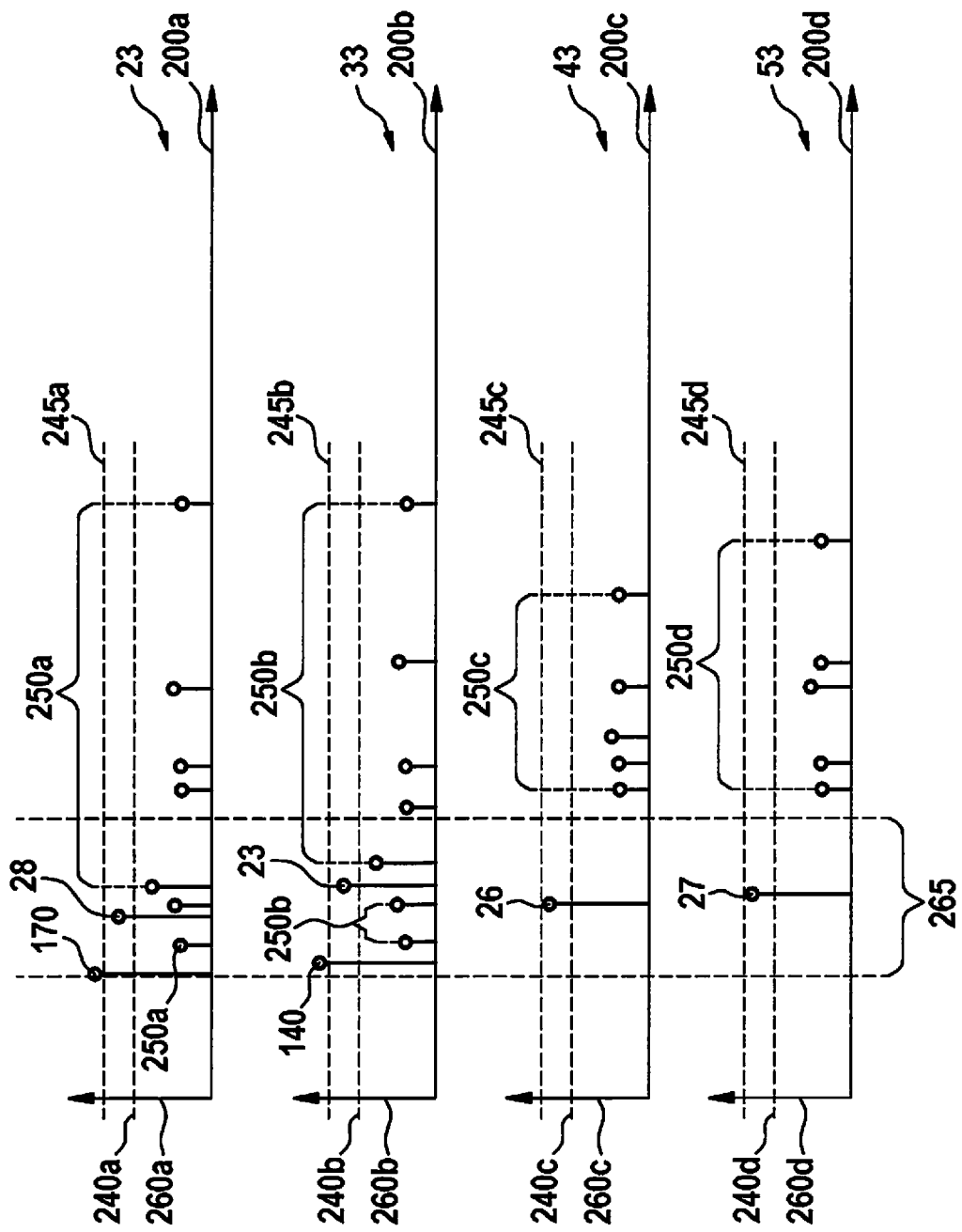

FIG. 3b shows a possible first ultrasonic signal sequence 23, second ultrasonic signal sequence 33, third ultrasonic signal sequence 43 and fourth ultrasonic signal sequence 53 of associated first ultrasonic receiver 20, second ultrasonic receiver 30, third ultrasonic receiver 40 and fourth ultrasonic receiver 50, which are able to occur as a result of the situation depicted in FIG. 3a. In contrast to FIG. 2b, processing unit 15 is then unable to ascertain any first direct receive signal in first ultrasonic signal sequence 22. In addition, it is determined by a comparison of first ultrasonic signal sequence 22 with second ultrasonic signal sequence 32 that the second ultrasonic signal sequence includes a second receive signal 141. The first ultrasonic signal sequence, however, includes a first receive signal 28, the second ultrasonic signal sequence includes a second receive signal 29, the third ultrasonic signal sequence includes a third receive signal 26 and the fourth ultrasonic signal sequence includes a fourth receive signal 27. Processing unit 15 ascertains from this that an object 66 is located between primary coil 190 and secondary coil 180. Processing unit 15 is also able to again ascertain the position and a possible movement of object 66.

Figure 4:
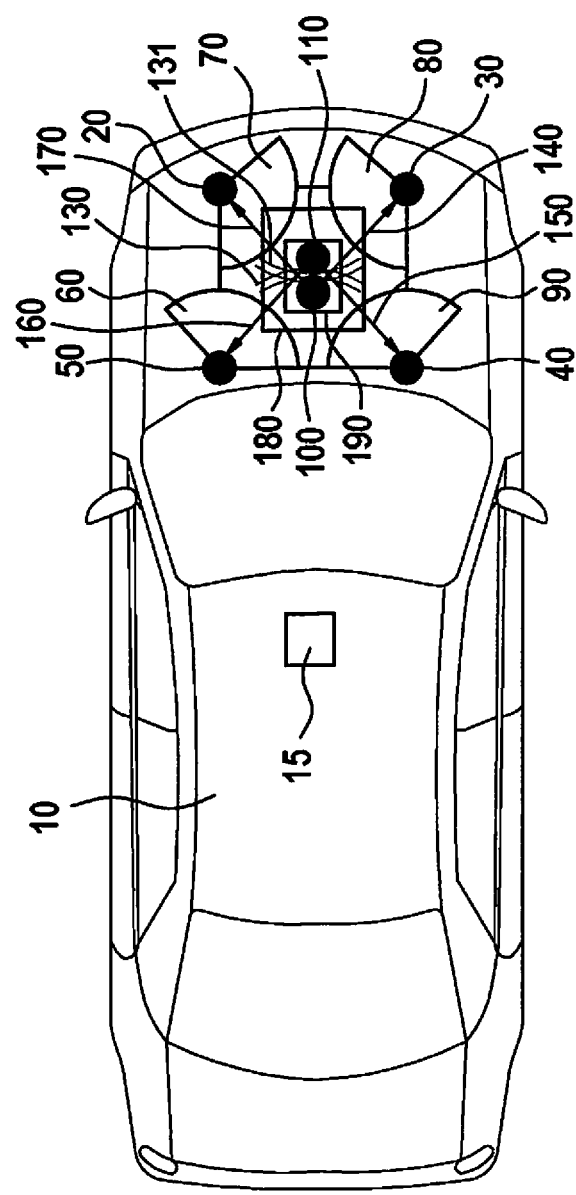
FIG. 4 shows a second specific embodiment of the device for detecting at least one object in the area between a primary coil and a secondary coil of an inductive charging device.

FIG. 4a, in contrast to FIGS. 1a, 2a and 3a, shows a device for detecting at least one object in the area between primary coil 190 and secondary coil 180, which includes an additional second ultrasonic transmitter 110, which is also situated at a lateral edge of primary coil 190. Second ultrasonic transmitter 110 transmits second ultrasonic signal 131 in the form of sound waves in the direction of first ultrasonic transmitter 100. Third sound beam 90 of third ultrasonic receiver 40 and fourth sound beam 60 of fourth ultrasonic receiver 50 are oriented in such a way that third ultrasonic receiver 40 is able to receive a third direct receive signal 150 from second ultrasonic transmitter 110 and fourth ultrasonic receiver 50 is able to receive a fourth direct receive signal 160 from second ultrasonic transmitter 110. First ultrasonic transmitter 100 and second ultrasonic transmitter 110 in this case emit alternatingly, for example, first ultrasonic signal 130 and second ultrasonic signal 131. The ultrasonic signals may be coded in this case in order to be able to better distinguish the ultrasonic signals from one another.

Figure 5A:
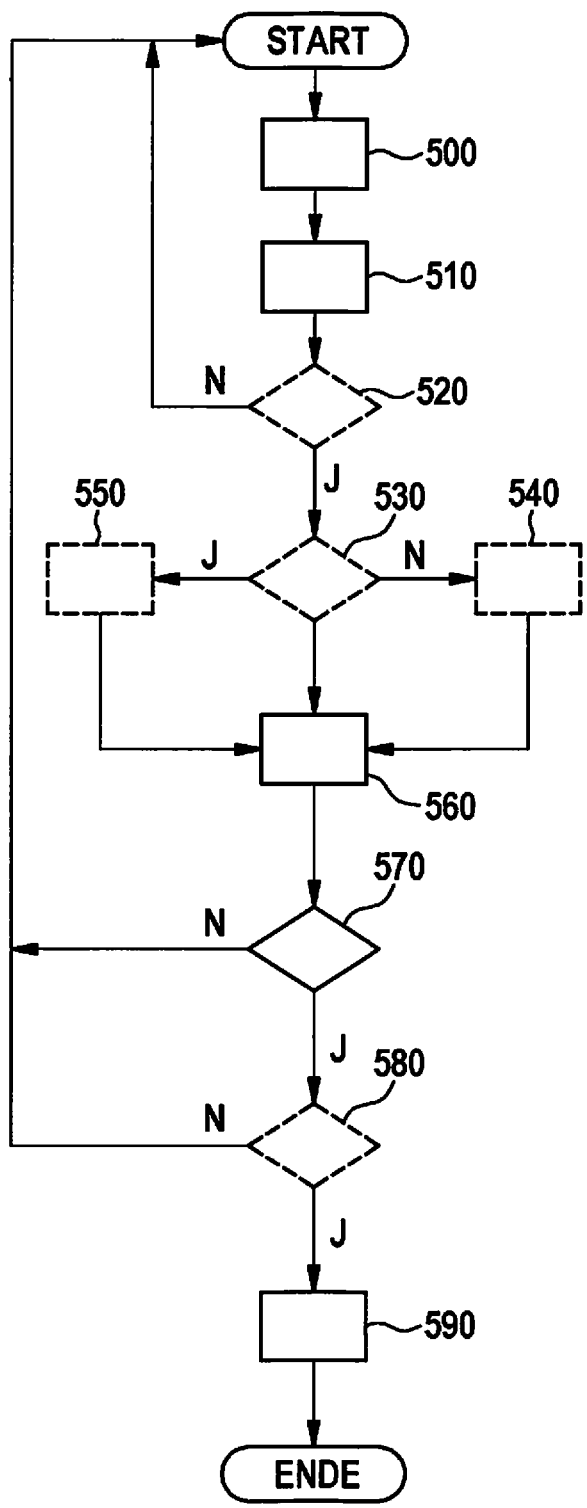
FIG. 5a shows a first method sequence for detecting at least one object in the area between a primary coil and a secondary coil of an inductive charging device for a vehicle.

FIG. 5a shows a first method sequence for detecting at least one object in the area between a primary coil and a secondary coil of an inductive charging device for a vehicle according to one possible embodiment of the present invention. In a first method step 500 in this method sequence, a first ultrasonic signal is initially emitted with the aid of a first ultrasonic transmitter. In a method step 510 following method step 500, a first ultrasonic signal sequence is received with the aid of a first ultrasonic receiver. In a method step 560 following method step 510, a first direct receive signal and/or additional receive signals is/are ascertained within the first ultrasonic signal sequence with the aid of a processing unit. In a method step 570 following method step 560, first received ultrasonic signal sequence is compared with a first reference ultrasonic signal sequence. In this case, the reference ultrasonic signal sequence characterizes, for example, a stored ultrasonic signal sequence, in which no object is detected in the area between the primary coil and the secondary coil. If no deviation is determined, the method is ended or alternatively started from the beginning. If a deviation is determined in the comparison, an object is detected in the area between the primary coil and the secondary coil in a method step 590 following method step 570. The method is then ended.

Optionally, it is checked in a method step 520 following method step 510 whether the amplitude of a signal within the first ultrasonic signal sequence exceeds a first threshold value. If no amplitude exceeds the first threshold value, the method is ended or alternatively started from the beginning. If an amplitude of at least one signal exceeds the first threshold value, method step 520 is continued. There it is checked whether an amplitude of a signal also exceeds a second threshold value, which is greater than the first threshold value. If an amplitude of a signal exceeds this second threshold value, a first direct receive signal is ascertained in method step 550. If the amplitude of the signal does not exceed the second threshold value, a first receive signal is ascertained in method step 540.

Optionally, it is checked in a method step 580 following method step 570 which deviation has been determined in the comparison between first ultrasonic signal sequence and reference ultrasonic signal sequence. If in the first ultrasonic signal sequence no first direct receive signal and/or a first, ascertained receive signal has been determined in the comparison, an object is detected in following method step 590.

Figure 5B:
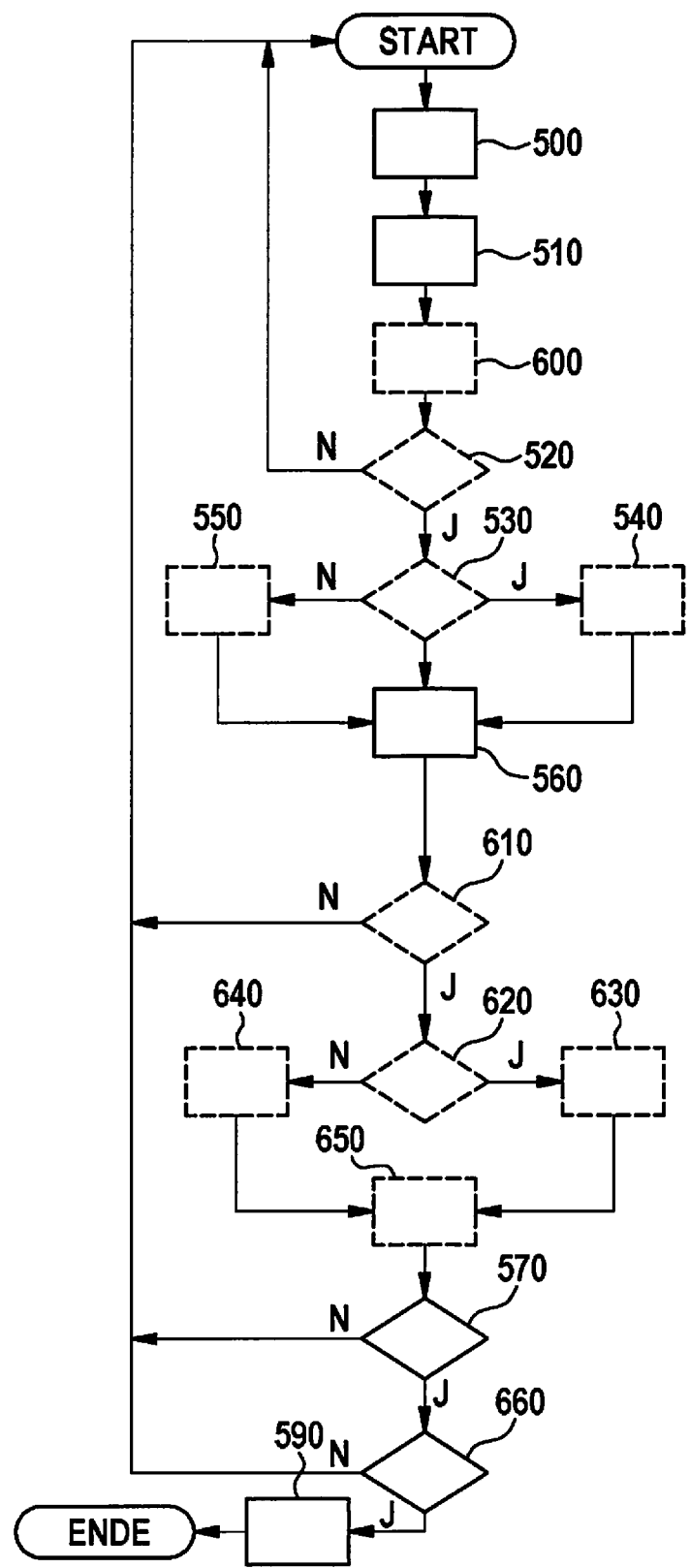
FIG. 5b shows a second method sequence for detecting at least one object in the area between a primary coil and a secondary coil of an inductive charging device for a vehicle.

FIG. 5b shows a second method sequence for detecting at least one object in the area between a primary coil and a secondary coil of an inductive charging device for a vehicle. In contrast to the method sequence in FIG. 5a, a second ultrasonic signal sequence in the method sequence depicted is optionally received with the aid of a second ultrasonic receiver in a method step 600 following method step 510. In a method step 610 following method step 560, it is checked whether the amplitude of a signal within the second ultrasonic sequence exceeds a third threshold value. If no amplitude exceeds the first threshold value, the method is ended or alternatively started from the beginning. If an amplitude of at least one signal exceeds the third threshold value, method step 620 is continued. There it is checked whether an amplitude of a signal also exceeds a fourth threshold value, which is greater than the third threshold value. If an amplitude of a signal exceeds this fourth threshold value, a second direct receive signal is ascertained in method step 640. If the amplitude of the signal does not exceed the fourth threshold value, a second receive signal is ascertained in method step 630. Thereafter, a second direct receive signal and/or additional receive signals is/are ascertained within the second ultrasonic signal sequence in method step 650. In method step 570, the first received ultrasonic signal sequence is then again compared with a reference ultrasonic signal sequence, the second ultrasonic signal sequence then being used as the reference ultrasonic signal sequence, however. In optional method step 660 following method step 570, it is checked which deviation has been determined in the comparison between first ultrasonic signal sequence and the reference ultrasonic signal sequence. If it is determined in such case that the first ultrasonic signal sequence includes no first direct receive signal and/or the second ultrasonic signal sequence includes no second direct receive signal and/or the first ultrasonic signal sequence includes a first receive signal and/or the second ultrasonic signal sequence includes a second receive signal, an object is detected in following method step 590.

What is claimed is:

1. A method for detecting at least one object in the area between a primary coil and a secondary coil of an inductive charging device for a vehicle, the method comprising: emitting a first ultrasonic signal with a first ultrasonic transmitter situated at the primary coil of the inductive charging device; receiving a first ultrasonic signal sequence with the aid of a first ultrasonic receiver situated at the vehicle, the first ultrasonic signal sequence including at least one first direct receive signal, which corresponds to a direct transmission of the first ultrasonic signal from the first ultrasonic transmitter to the first ultrasonic receiver, and/or including additional receive signals, which correspond to an indirect transmission of the first ultrasonic signal from the first ultrasonic transmitter to the first ultrasonic receiver; ascertaining a first direct receive signal and/or additional receive signals within the first ultrasonic signal sequence; comparing the first received ultrasonic signal sequence with a first reference ultrasonic signal sequence; detecting at least one object in the area between the primary coil and the secondary coil as a function of the comparison between the first ultrasonic signal sequence and the reference ultrasonic signal sequence; and receiving a second ultrasonic signal sequence with the aid of a second ultrasonic receiver situated at the vehicle, the second ultrasonic signal sequence including at least one second direct receive signal, which corresponds to the direct transmission of the first ultrasonic signal from the first ultrasonic transmitter to the second ultrasonic receiver, and/or including additional receive signals, which correspond to the indirect transmission of the first ultrasonic signal from the first ultrasonic transmitter to the second ultrasonic receiver.

2. The method of claim 1, wherein the first reference ultrasonic signal sequence corresponds to an ultrasonic signal sequence, in which no object is detected in the area between the primary coil and the secondary coil.

3. The method of claim 2, wherein the object is detected in the area between the primary coil and the secondary coil if the first ultrasonic signal sequence and the first reference ultrasonic signal sequence differ by the first direct receive signal and/or by a first ascertained receive signal, the first receive signal corresponding to the indirect transmission of the first ultrasonic signal from the first ultrasonic transmitter to the first ultrasonic receiver and to a reflection of the first ultrasonic signal at the object.

4. The method of claim 1, wherein a first receive signal, which corresponds to the indirect transmission of the first ultrasonic signal from the first ultrasonic transmitter to the first ultrasonic receiver and to a reflection of the first ultrasonic signal at the object, is ascertained as a function of an exceedance of a first threshold value by an amplitude of the first receive signal, and wherein the first direct receive signal being ascertained as a function of an exceedance of a second threshold value by an amplitude of the first direct receive signal, the second threshold value being greater than the first threshold value.

5. The method of claim 1, further comprising: ascertaining the second direct receive signal and/or additional receive signals within the second ultrasonic signal sequence; comparing the first received ultrasonic signal sequence with the second received ultrasonic signal sequence as a reference ultrasonic signal sequence; and detecting at least one object in the area between the primary coil and the secondary coil of the inductive charging device, if the first ultrasonic signal sequence includes no first direct receive signal, and/or the second ultrasonic signal sequence includes no second direct receive signal, and/or the first ultrasonic signal sequence includes a first receive signal, which corresponds to the indirect transmission of the first ultrasonic signal from the first ultrasonic transmitter to the first ultrasonic receiver and to a reflection of the first ultrasonic signal at the object, and/or the second ultrasonic signal sequence includes a second receive signal, which corresponds to the indirect transmission of the first ultrasonic signal from the first ultrasonic transmitter to the second ultrasonic receiver and to the reflection of the first ultrasonic signal at the object.

6. The method of claim 5, wherein: the first receive signal, which corresponds to the first ultrasonic transmitter to the first ultrasonic receiver and to the reflection of the first ultrasonic signal at the object, is ascertained as a function of an exceedance of a first threshold value by an amplitude of the first receive signal, the second receive signal, which corresponds to the indirect transmission of the first ultrasonic signal from the first ultrasonic transmitter to the second ultrasonic receiver and to the reflection of the first ultrasonic signal at the object, is ascertained as a function of an exceedance of a third threshold value by an amplitude of the second receive signal, the first direct receive signal is ascertained as a function of an exceedance of a second threshold value by an amplitude of the first direct receive signal, and the second direct receive signal is ascertained as a function of an exceedance of a fourth threshold value by an amplitude of the second direct receive signal, the second threshold value being greater than the first threshold value and the third threshold value being greater than the fourth threshold value.

7. The method of claim 1, wherein each ultrasonic signal sequence is received in an associated timed measuring window, and wherein the measuring windows of the respective ultrasonic receivers is synchronized to one another.

8. A device for detecting at least one object in the area between a primary coil and a secondary coil of an inductive charging device for a vehicle, comprising: a first ultrasonic transmitter situated at the primary coil of the inductive charging device, which is configured to emit at least one ultrasonic signal; and a first ultrasonic receiver situated at the vehicle, which is configured to receive at least one first ultrasonic signal sequence, the first ultrasonic signal sequence including at least one first direct receive signal, which corresponds to a direct transmission of the first ultrasonic signal from the first ultrasonic transmitter to the first ultrasonic receiver, and/or additional receive signals, which correspond to an indirect transmission of the first ultrasonic signal from the first ultrasonic transmitter to the first ultrasonic receiver; at least one processing unit, the processing unit being configured to ascertain the first direct receive signal and/or the additional receive signals within the first ultrasonic signal sequence, to compare the first received ultrasonic signal sequence with a first reference ultrasonic signal sequence, and to detect at least one object in the area between the primary coil and the secondary coil as a function of the comparison between the first ultrasonic signal sequence and the reference ultrasonic signal sequence; and a second ultrasonic receiver situated at the vehicle, which is configured to receive at least one second ultrasonic signal sequence, the second ultrasonic signal sequence including at least one second direct receive signal, which corresponds to the direct transmission of the first ultrasonic signal from the first ultrasonic transmitter to the second ultrasonic receiver, and/or additional receive signals, which correspond to the indirect transmission of the first ultrasonic signal from the first ultrasonic transmitter to the second ultrasonic receiver.

9. The device of claim 8, further comprising: a third ultrasonic receiver and a fourth ultrasonic receiver situated at the vehicle, the third ultrasonic receiver and the fourth ultrasonic receiver being situated so that the third ultrasonic receiver receives a third ultrasonic signal sequence, the third ultrasonic signal sequence including only additional receive signals, which correspond to the indirect transmission of the first ultrasonic signal from the first ultrasonic transmitter to the third ultrasonic receiver, and the fourth ultrasonic receiver receiving a fourth ultrasonic signal sequence, the fourth ultrasonic signal sequence including only additional receive signals, which correspond to the indirect transmission of the first ultrasonic signal from the first ultrasonic transmitter to the fourth ultrasonic receiver; wherein the processing unit is configured to ascertain the second direct receive signal and/or additional receive signals within the second ultrasonic signal sequence, and to ascertain the additional receive signals within the third ultrasonic signal sequence, and to ascertain the additional receive signals within the fourth ultrasonic signal sequence, and to compare the first received ultrasonic signal sequence with the second and/or third and/or fourth received ultrasonic signal sequence, and to detect the object in the area between the primary coil and the secondary coil of the inductive charging device, if the first and/or second ultrasonic signal sequence include/includes no first direct receive signal and/or the first ultrasonic signal sequence includes a first receive signal, which corresponds to the indirect transmission of the first ultrasonic signal from the first ultrasonic transmitter to the first ultrasonic receiver and to a reflection of the first ultrasonic signal at the object, and/or the second ultrasonic signal sequence includes a second receive signal, which corresponds to the indirect transmission of the first ultrasonic signal from the first ultrasonic transmitter to the second ultrasonic receiver and to the reflection of the first ultrasonic signal at the object, and/or the third ultrasonic signal sequence includes a third receive signal which corresponds to the indirect transmission of the first ultrasonic signal from the first ultrasonic transmitter to the third ultrasonic receiver and to the reflection of the first ultrasonic signal at the object, and/or the fourth ultrasonic signal sequence includes a fourth receive signal, which corresponds to the indirect transmission of the first ultrasonic signal from the first ultrasonic transmitter to the fourth ultrasonic receiver and to the reflection of the first ultrasonic signal at the object.

10. The device of claim 9, wherein the device includes a second ultrasonic transmitter situated at the primary coil of the inductive charging device for emitting at least one second ultrasonic signal, the first and second ultrasonic transmitters being situated so that the first ultrasonic signal is emitted in the direction of the second ultrasonic transmitter and the second ultrasonic signal is emitted in the direction of the first ultrasonic transmitter, the third and fourth ultrasonic receivers being configured to receive a third and fourth direct receive signal, which corresponds to a direct transmission of the second ultrasonic signal from the second ultrasonic transmitter to the third and fourth ultrasonic receiver.

11. The device of claim 10, wherein the first ultrasonic transmitter and second ultrasonic transmitter are configured to alternatingly emit the first and second ultrasonic signal and to code the first and second ultrasonic signal.

12. The device of claim 9, wherein the first, second, third and fourth ultrasonic receiver are situated so that the secondary coil of the inductive charging device situated at the vehicle is located centrally within the arrangement of the ultrasonic receivers.

13. The device of claim 8, wherein each of the ultrasonic transmitters is configured to repeatedly emit a first and/or second ultrasonic signal and each ultrasonic receiver is configured to receive at least one additional subsequent ultrasonic signal sequence, the processing unit being configured to detect at least one object in the area between the primary coil and the secondary coil of the inductive charging device as a function of a comparison of successive ultrasonic signal sequences with the associated reference ultrasonic signal sequences.

* * * * *